United States Patent
Chen et al.

(10) Patent No.: US 8,289,375 B2
(45) Date of Patent: Oct. 16, 2012

(54) IMAGE PROCESSING METHOD

(75) Inventors: Chien-Hung Chen, Taipei County (TW); Chun-Chieh Chiu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 416 days.

(21) Appl. No.: 12/661,049

(22) Filed: Mar. 9, 2010

(65) Prior Publication Data

US 2011/0149027 A1 Jun. 23, 2011

(30) Foreign Application Priority Data

Dec. 21, 2009 (TW) .............................. 98143936 A

(51) Int. Cl.
*H04N 13/00* (2006.01)
(52) U.S. Cl. ........................................................ 348/43
(58) Field of Classification Search ................... 348/43
See application file for complete search history.

(56) References Cited

U.S. PATENT DOCUMENTS

| 6,584,219 B1* | 6/2003 | Yamashita et al. ............ 382/154 |
| 7,319,720 B2 | 1/2008 | Abrams, Jr. |
| 2010/0033554 A1* | 2/2010 | Kobayashi ...................... 348/43 |
| 2010/0104219 A1* | 4/2010 | Limonov ....................... 382/285 |

* cited by examiner

*Primary Examiner* — David Czekaj
*Assistant Examiner* — Leron Beck
(74) *Attorney, Agent, or Firm* — J.C. Patents

(57) ABSTRACT

An image processing method including the following steps is provided. First, a two-dimensional original image is received. Next, a plurality of depth values corresponding to the two-dimensional original image are received. Afterwards, a two-dimensional shifting image is obtained according to the depth values and a standard value. A plurality of shifting values exist between the two-dimensional shifting image and the two-dimensional original image, and the shifting values are determined by a plurality of differences between the depth values and the standard value. Thereafter, a three-dimensional image is produced according to the two-dimensional original image and the two-dimensional shifting image.

20 Claims, 11 Drawing Sheets

IMAGE PROCESSING METHOD

CROSS-REFERENCE TO RELATED APPLICATION

This application claims the priority benefit of Taiwan application serial no. 98143936 filed on Dec. 21, 2009. The entirety of the above-mentioned patent application is hereby incorporated by reference herein and made a part of this specification.

BACKGROUND OF THE INVENTION

1. Field of the Invention

The invention is generally related to an image processing method, and more particularly to an image processing method for producing three-dimensional (3D) images.

2. Description of Related Art

As technology progresses and advances, people's needs for fulfillment on a material and a spiritual level have not lessened but instead, have increased. On the spiritual level, in this age of rapid technological development, people are eager to express their imagination through a three-dimensional (3D) display, so as to vividly experience an effect of being personally in a scene. Therefore, how to present a 3D image or video with the 3D display has become a major objective that current 3D display techniques seek to achieve.

3D display techniques can be roughly divided into stereoscopic techniques which require a user to wear a specially designed pair of glasses, and auto-stereoscopic techniques which directly allow viewing with a naked eye. The maturing development of the stereoscopic techniques is evident, and such techniques have found specialized applications in military simulations or large entertainment venues. However, because of unsatisfactory convenience and comfort factors of the stereoscopic techniques, these techniques have found resistance in widespread implementation. Therefore, the auto-stereoscopic techniques have gradually been developed and have become the new trend.

With regards to the current auto-stereoscopic techniques, these techniques mainly employ a viewer's left eye and right eye seeing a left eye image and a right eye image of different parallax, respectively, so as to achieve a 3D visual effect for the viewer. Generally speaking, the left eye image and the right eye image can be respectively obtained by two cameras. Alternatively, a 3D camera can be used to directly capture the left and right eye images, in which the 3D camera is constructed with two cameras or a camera having two or more photographic lenses. However, an image captured by using the aforesaid device has a fixed depth. Therefore, the user cannot freely adjust a stereo degree of the captured image according to a personal preference.

SUMMARY OF THE INVENTION

An aspect of the invention provides an image processing method using a relationship between different depths in 2D image to produce a 3D image.

An aspect of the invention provides an image processing method including the following steps. First, a 2D original image is received. Next, a plurality of depth values corresponding to the 2D original image are received. Thereafter, according to the depth values and a standard value, a 2D shifting image is obtained, in which a plurality of shifting values exist between the 2D shifting image and the 2D original image, and the shifting values are determined by a plurality of difference values between the depth values and the standard value. Next, according to the 2D original image and the 2D shifting image, a 3D image is produced.

According to one embodiment of the invention, the depth values are less than or equal to the standard value.

According to one embodiment of the invention, the depth values are greater than or equal to the standard value.

According to one embodiment of the invention, the standard value is between a largest value and a smallest value of the depth values.

According to one embodiment of the invention, the 2D original image includes a plurality of image sub-regions, and the depth values respectively correspond to the image sub-regions for respectively representing a depth of each of the image sub-regions.

According to one embodiment of the invention, the 2D original image includes a plurality of first image sub-regions, and the 2D shifting image includes a plurality of second image sub-regions. Moreover, the second image sub-regions shift right relative to the first image sub-regions.

According to one embodiment of the invention, the 2D original image includes a plurality of first image sub-regions, and the 2D shifting image includes a plurality of second image sub-regions. Furthermore, the second image sub-regions shift left relative to the first image sub-regions.

According to one embodiment of the invention, the step of obtaining the 2D shifting image according to the depth values and the standard value, in which a plurality of shifting values exist between the 2D shifting image and the 2D original image, and the shifting values are determined by a plurality of difference values between the depth values and the standard value includes: determining the shifting values in accordance with multiplying a gain value with the difference values between the depth values and the standard value.

According to one embodiment of the invention, when a largest gray level value of the 2D original image is $GL_{max}$, each of the depth values is i, the standard value is a, each of the shifting values is Z, and the gain value used to adjust a gain degree of each of the shifting values is G, then Z, i, a, G, and $GL_{max}$ are related to each other by $$Z = G \times \left(1 - \frac{i-a}{GL_{max}}\right).$$

According to one embodiment of the invention, when the largest gray level value of the 2D original image is $GL_{max}$, each of the depth values is i, the standard value is a, each of the shifting values is Z, and the gain value used to adjust the gain degree of each of the shifting values is G, then Z, i, a, G, and $GL_{max}$ are related to each other by $$Z = G \times \left(\frac{i-a}{GL_{max}}\right).$$

According to one embodiment of the invention, the steps of producing the 3D image according to the 2D original image and the 2D shifting image are described hereafter. First, a first eye image according to the 2D original image is obtained. Next, a second eye image according to the 2D shifting image is obtained. Thereafter, the 3D image is produced by combining the first eye image and the second eye image. In one embodiment of the invention, the step of obtaining the first eye image according to the 2D original image includes: obtaining the first eye image according to a plurality of odd-numbered columns of image sub-regions of the 2D original image. In another embodiment of the invention, the step of obtaining the second eye image according to the 2D shifting image includes: obtaining the second eye image according to a plurality of even-numbered columns of image sub-regions of the 2D shifting image. In yet another embodiment of the invention, the step of producing the 3D image by combining the first eye image and the second eye image includes: producing the 3D image by combining the odd-numbered columns of image sub-regions with the even-numbered columns of image sub-regions, wherein the odd-numbered columns of image sub-regions are arranged alternating with the even-numbered columns of image sub-regions.

In summary, the image processing method provided by the invention embodied herein can produce a 3D image with a readily available 2D image. The 3D effect of the 3D image is achieved by using the depth of each of the image sub-regions as the basis.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

An image processing method provided by the invention embodied herein may be applied in various types of displays encompassing three-dimensional (3D) display technologies. Further description is provided below in FIG. 1 with a process flow diagram illustrating the steps of a driving method, along with several exemplary embodiments of the invention.

First Embodiment

Figure 2:
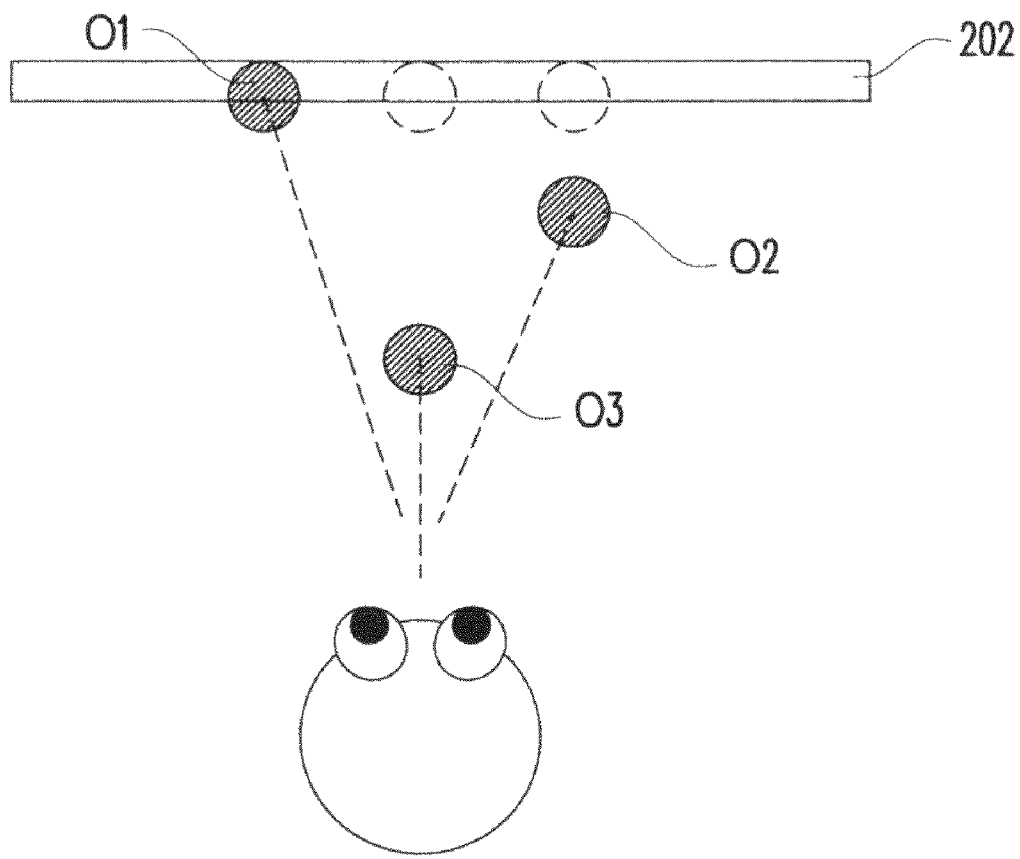
FIG. 2 illustrates a schematic diagram of a 3D image having a 3D effect of protruding out of a display panel in accordance with a first embodiment of the invention.

Referring to FIG. 2, the present embodiment assumes a 3D image viewed by a pair of human eyes possesses a 3D effect as if the 3D image appears outside of a display panel 202.

Figure 1:
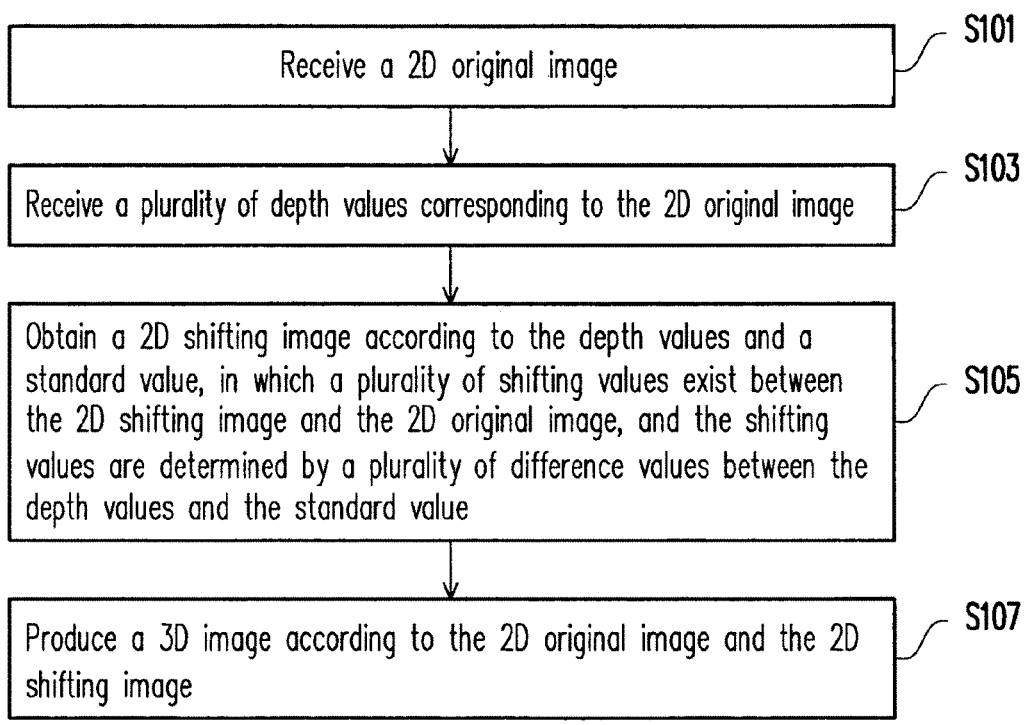
FIG. 1 is a process flow diagram illustrating the steps of a driving method in accordance with an embodiment of the invention.

Referring to FIG. 1, in Step S101, first a two-dimensional (2D) original image is received. The present embodiment uses a 2D original image 200 illustrated in FIG. 2A as an example.

Thereafter, in Step S103, a plurality of depth values corresponding to the 2D original image 200 are received. The aforementioned plurality of depth values are important bases for forming a 3D image in accordance with the 2D original image 200. For the 2D original image 200, a viewer observes that a flower therein appears to be closest to the viewer, a grassy area the next closest, and the trees appear the farther away from the viewer, whereas the sky appears the farthest. In other words, with respect to the viewer, a depth corresponding to the flower in the 2D original image 200 is comparatively the smallest, the depth corresponding to the grassy area the next smallest, the depth corresponding to the trees comparatively larger, and the depth corresponding to the sky the largest. The above-described relationship of the depth values can be represented as a depth value of the flower $i_1$<a depth value of the grassy area $i_2$<a depth value of the trees $i_3$<a depth value of the sky $i_4$.

Figure 2A:
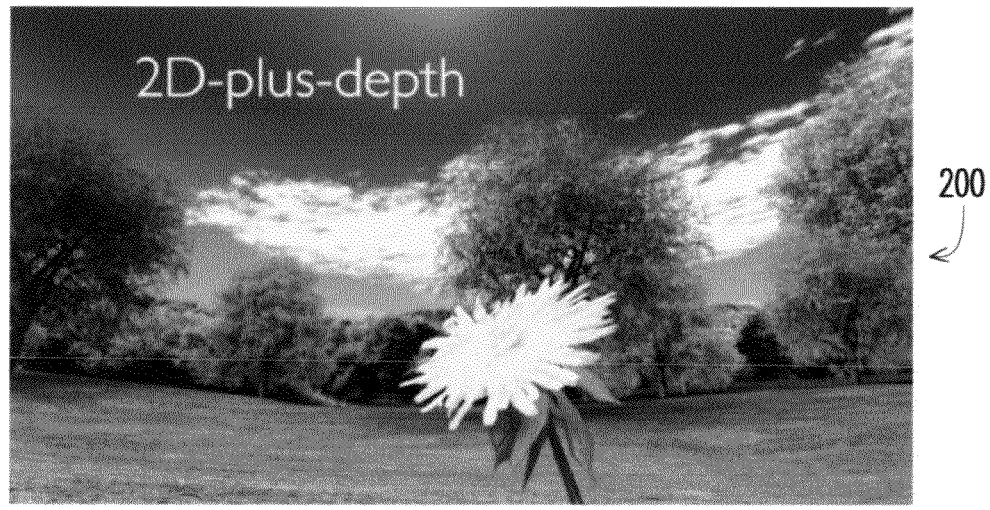
FIG. 2A illustrates a 2D original image and a schematic diagram of a 2D grayscale image thereof in accordance with the first embodiment of the invention.
Figure 2A:
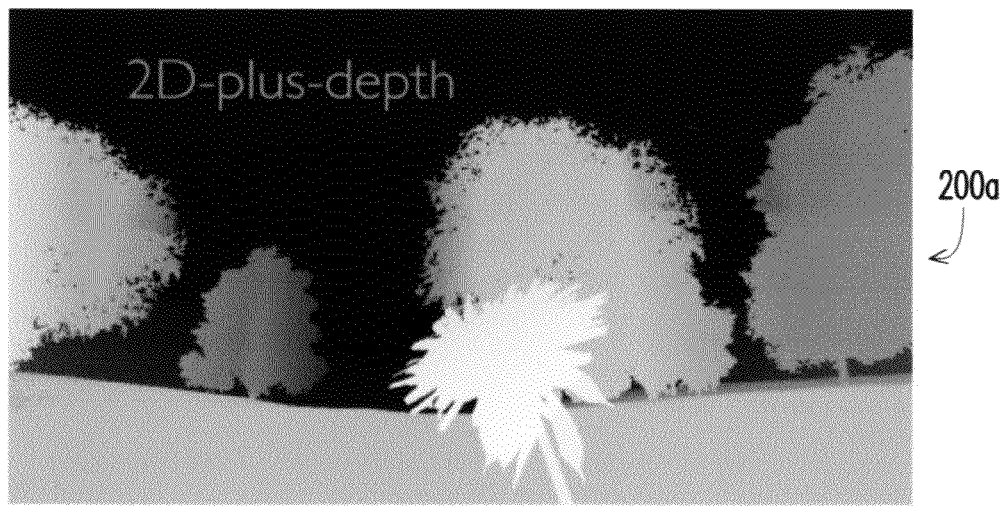

In order to specifically delineate the above-described depth concept, the present embodiment employs a gray level distribution of a 2D grayscale image 200a as illustrated in FIG. 2A to describe the differences between each depth. The flower, the grassy area, the trees, and the sky in the 2D grayscale image 200a and the 2D original image 200 have the same relative positions. In the 2D grayscale image 200a, since the depth value corresponding to the flower is comparatively the smallest, the brightness of the flower is the highest. Since the depth value corresponding to the grassy area is the next smallest, the brightness of the grassy area is lower than the flower. Since the depth value corresponding to the sky is the largest, therefore the brightness of the sky is the lowest. Since the depth value corresponding to the trees is between the depth values of the grassy area and the sky, thus the brightness of the trees is between the brightness of the grassy area and the sky.

As shown in FIG. 2, in the present embodiment of the invention, assuming a depth of the sky observed by human eyes is a distance between the human eyes and the display panel 202, then the flower, the grassy area, and the trees observed by the human eyes may extend toward the human eyes as if protruding out the display panel 202.

Figure 2B:
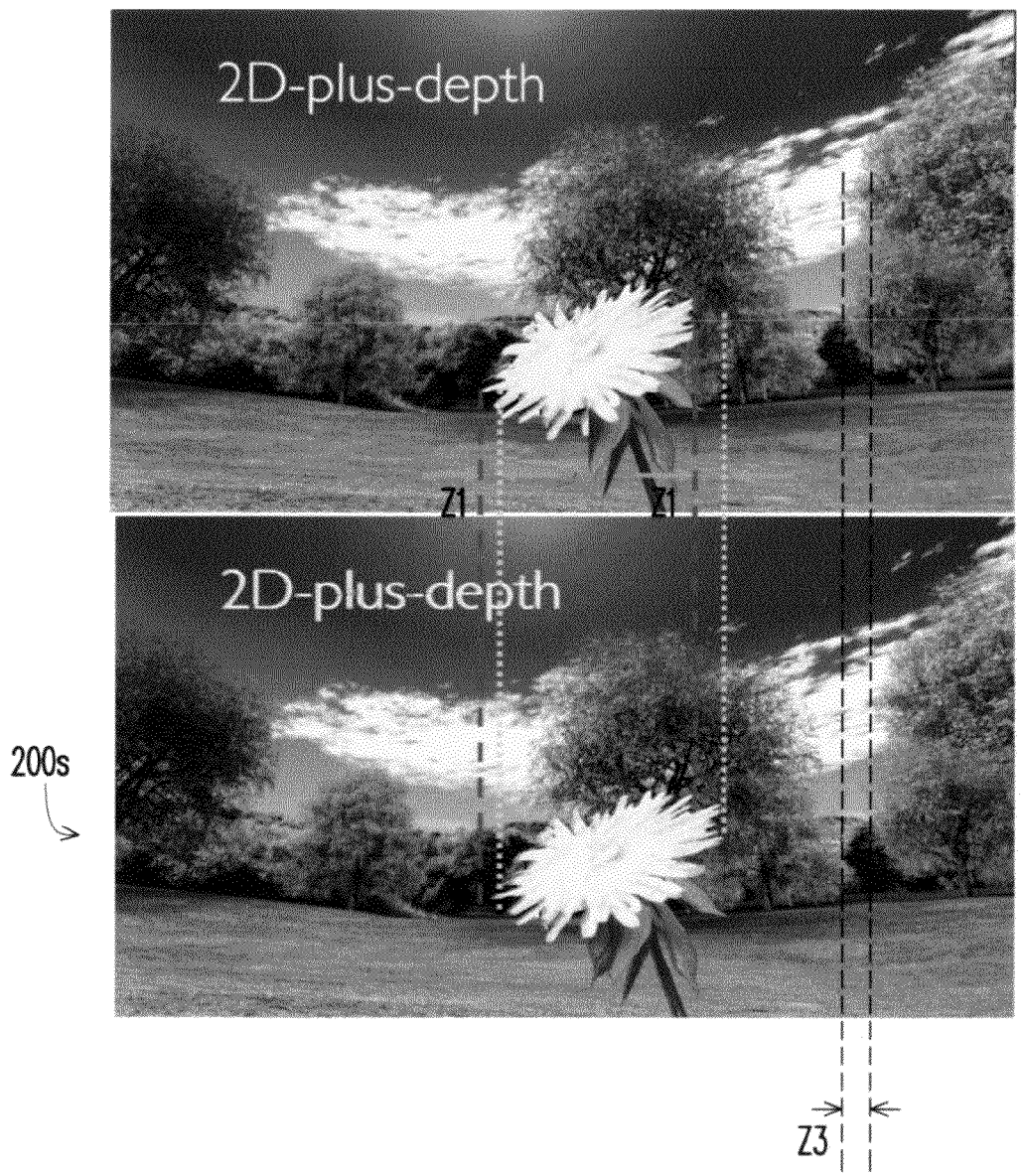
FIG. 2B illustrates a 2D original image and a schematic diagram of a 2D shifting image thereof in accordance with the first embodiment of the invention.

In light of the foregoing, the present embodiment uses the sky, having the largest depth, as a basis point. That is, the depth value $i_4$ of the sky is used as a standard value. Next, according to the relationship between the depth values $i_1$, $i_2$, $i_3$ and the standard value $i_4$, the present embodiment shifts the flower, the grassy area, and the trees in the 2D original image 200 so as to form a 2D shifting image 200S depicted in FIG. 2B. It should be noted that in subsequent steps, the present embodiment can use the 2D original image 200 and the 2D shifting image 200S to form an image having the 3D effect.

In the present embodiment of the invention, a shifting degree of the aforementioned shifting process is determined by the relationship between the depth values $i_1$, $i_2$, $i_3$ and the standard value $i_4$. More specifically, the shifting degree of the flower in the 2D shifting image 200S relative to the flower in the 2D original image 200 is determined by a difference value $\Delta i_1$ between the depth value $i_1$ and the standard value $i_4$. Moreover, the shifting degree of the grassy area in the 2D shifting image 200S relative to the grassy area in the 2D original image 200 is determined by a difference value $\Delta i_2$ between the depth value $i_2$ and the standard value $i_4$. In addition, the shifting degree of the trees in the 2D shifting image 200S relative to the trees in the 2D original image 200 is determined by a difference value $\Delta i_3$ between the depth value $i_3$ and the standard value $i_4$ (Step S105).

In the present embodiment of the invention, when the difference value between the depth values and the standard value increases, then the shifting degree increases. Conversely, when the difference value decreases, the shifting degree decreases. Since the difference value $\Delta i_1$>the difference value $\Delta i_2$>difference value $\Delta i_3$ in the present embodiment, a shifting value $Z_1$ of the flower in the 2D shifting image 200S can be deduced to be greater than the shifting value of the grassy area in the 2D shifting image 200S (not drawn). Moreover, the shifting value of the grassy area in the 2D shifting image 200S can be deduced to be greater than a shifting value $Z_3$ of the trees in the 2D shifting image 200S.

In light of the foregoing description, a size of the shifting values $Z_1, Z_3, \ldots$ is respectively determined by the difference values $\Delta i_1, \Delta i_3, \ldots$ However, in other embodiments of the invention, the size of each of the shifting values in the 2D shifting image 200S may be further determined by a gain degree of the difference values between the depth values and the standard value. That is, the size of the shifting value $Z_1$ is determined by the gain degree of the difference value $\Delta i_1$ between the depth value $i_1$ and the standard value $i_4$. Moreover, the size of the shifting value $Z_3$ is determined by the gain degree of the difference value $\Delta i_3$ between the depth value $i_3$ and the standard value $i_4$, and likewise for other shifting values.

In addition, in the shifting process of the flower, the grassy area, and the trees in the 2D original image 200 employed in order to achieve the protruding effect of the 3D image out of the display panel 202 for viewing by human eyes, the shifting process includes shifting the flower, the grassy area, and the trees in the 2D original image 200 toward a same direction (e.g., shifting towards the left or the right; in the present embodiment the shifting direction is toward the right).

Accordingly, assuming the depth values, the standard value, the shifting values, and a gain value used to adjust the gain degree of the shifting values are i, a, Z and G, respectively, then a relationship between each of the depth values i, the standard value a, each of the shifting values Z, and the gain value G can be expressed as $$Z = G \times \left(\frac{i-a}{GL_{max}}\right).$$

Herein, $GL_{max}$ is the largest gray level value of the 2D original image 200. It should be noted that, the size of the shifting values Z can also be solely determined by the difference value between the depth values i and the standard value a. In this case, the gain value G is taken be equal to 1.

Thereafter in Step S107, a 3D image is produced in accordance with the above-described 2D original image 200 and the 2D shifting image 200S, and the details for producing the 3D image are described later in the specification. It should be mentioned that in the present embodiment of the invention, the sky in the 3D image appears to be disposed on the display panel 202 (e.g., an object O1 depicted in FIG. 2), whereas the trees, the grassy area and the flower appear to be protruding out of the display panel 202 (e.g., an object O2 and an object O3 depicted in FIG. 2).

Figure 3:
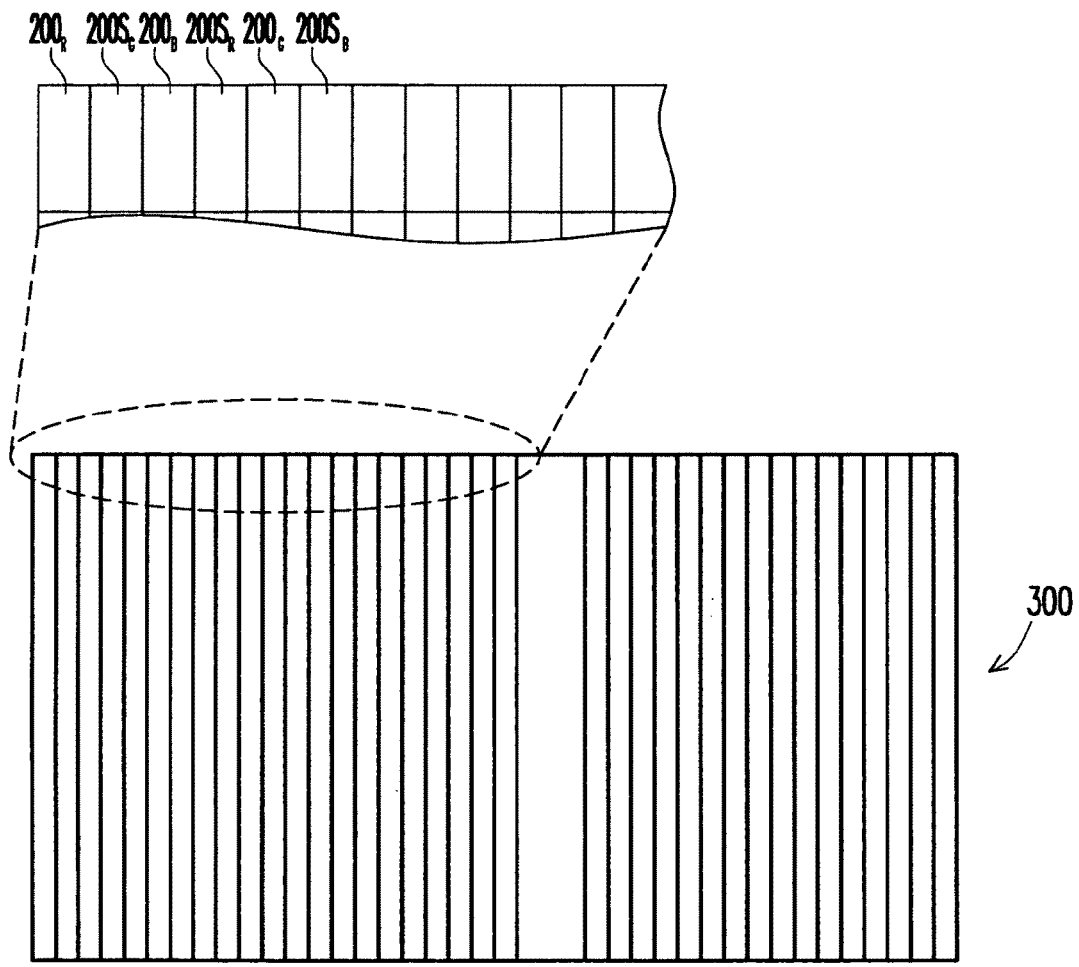
FIG. 3 is a schematic diagram illustrating a 3D image producing method in accordance with the first embodiment of the invention.

Specifically, with regards to the steps for producing the 3D image, the present embodiment employs the 2D original image 200 to produce a first eye image, employs the 2D shifting image 200S to produce a second eye image, and combines the first eye image and the second eye image to produce the 3D image. Referring to FIG. 3, FIG. 3 is a schematic diagram illustrating a 3D image producing method in accordance with the first embodiment of the invention. A 3D image 300 depicted in FIG. 3 is formed by arranging the first eye image and the second eye image in an alternating manner. The first eye image can be formed by a plurality of odd-numbered columns of image sub-regions $200_R$, $200_B$, $200_G$, ... of the 2D original image 200. Moreover, the second eye image can be formed by a plurality of even-numbered columns of image sub-regions $200S_G$, $200S_R$, $200S_B$, ... of the 2D shifting image 200S. The image sub-regions $200_R$, $200_B$, $200_G$, ... are respectively arranged alternating with the image sub-regions $200S_G$, $200S_R$, $200S_B$, ... to form the 3D image 300. In the present embodiment of the invention, an arrangement sequence of the image sub-regions is $200_R$-$200S_G$-$200_B$-$200S_R$-$200_G$-$200S_B$- ...

It should be noted that, the above-described arrangement sequence of the image sub-regions serves only as an exemplary sequence for the present embodiment, and the invention is not limited thereto. That is, the arrangement sequence of the image sub-regions can be arranged in different manners (e.g., arranging the three colors red(R), green(G), blue(B) in different order, or adjusting the fore and aft sequence of the first eye image and the second eye image ($200S_R$-$200_G$-$200S_B$-$200_R$-$200S_G$-$200_B$- ... ).

Figure 4:
FIG. 4 is a schematic diagram illustrating another 2D original image in accordance with the first embodiment of the invention.

In one embodiment of the invention, the above-described image processing method may be employed to represent a main feature of the 3D image having a shallower depth. Referring to FIG. 4, FIG. 4 is a schematic diagram illustrating another 2D original image in accordance with the first embodiment of the invention. In the depiction of FIG. 4, the flower with the shallower depth is the main feature this 3D image wishes to express. Therefore, the sky having the largest depth is used as the basis point, whereby the effect of the flower protruding out of the display panel is achieved for rendering a preferable 3D image.

Second Embodiment

Figure 5:
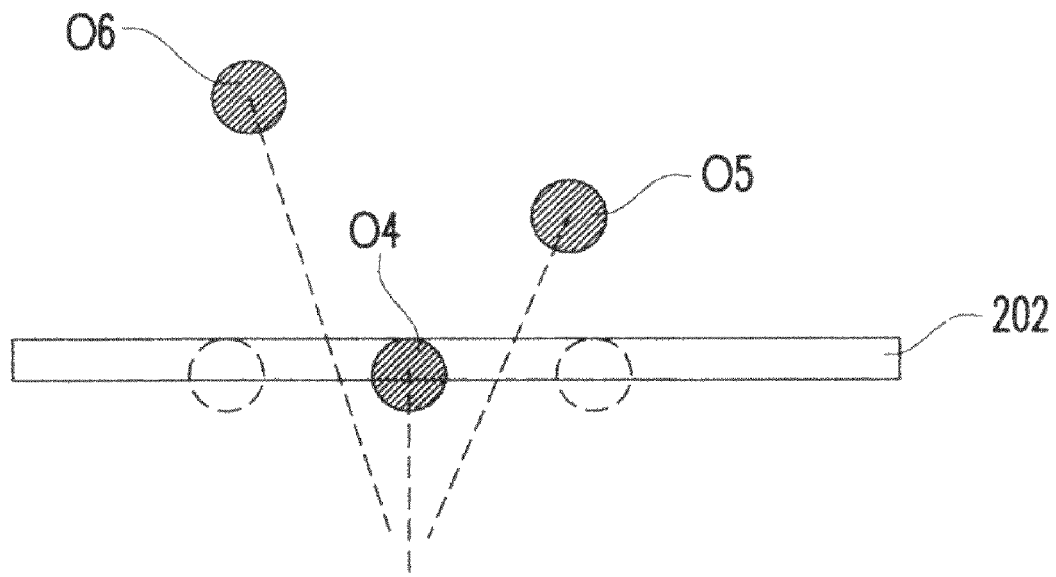
FIG. 5 illustrates a schematic diagram of a 3D image having a 3D effect of caving in a display panel in accordance with a second embodiment of the invention.
Figure 5:
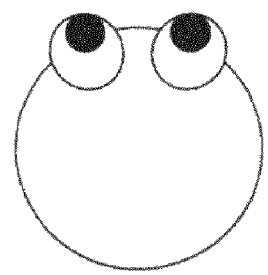

The spirit of the present embodiment is similar to the first embodiment, a main difference being the present embodiment assumes the 3D image, as observed by human eyes, has an effect of caving into the display panel 202, as shown in FIG. 5. However, reference numbers in the present embodiment which are the same as or similar to those in the previous embodiment represent the same or similar elements. Accordingly, no further description thereof is provided hereinafter.

Figure 5A:
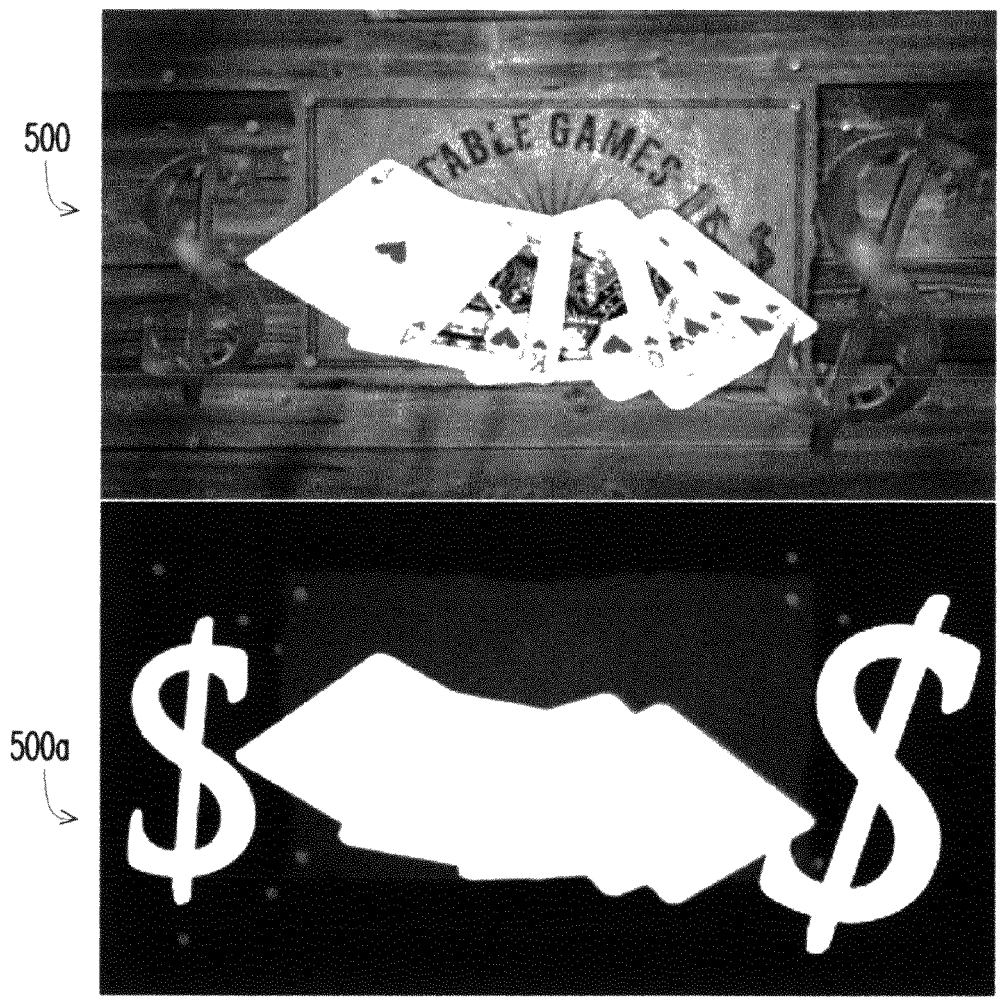
FIG. 5A illustrates a 2D original image and a schematic diagram of a 2D grayscale image thereof in accordance with the second embodiment of the invention.

Referring to FIG. 1, in Step S101, first a 2D original image is received. The present embodiment uses a 2D original image 500 illustrated in FIG. 5A as an example.

Thereafter, in Step S103, a plurality of depth values corresponding to the 2D original image 500 are received, as shown in a 2D grayscale image 500a. With regards to the 2D original image 500, a dollar sign appears closest to a viewer, a plurality of poker cards appear the next closest, and a bulletin board printed with the words "TABLE GAMES" appear the farthest away from the viewer. In other words, with respect to the viewer, the depth corresponding to the dollar sign is the smallest, the depth corresponding to the poker cards is the next smallest, and the depth corresponding to the bulletin board is the largest. That is, a depth value corresponding to the dollar sign $i_5$<a depth value corresponding to the poker cards $i_6$<a depth value corresponding to the bulletin board $i_7$.

In order to specifically delineate the above-described depth concept, a gray level distribution of a 2D grayscale image 500a is employed in the present embodiment to explain the differences between each of the depths. The dollar sign, the poker cards, and the bulletin board of the 2D grayscale image 500a and the 2D original image 500 have the same relative positions. In the 2D grayscale image 500a, the depth corresponding to the dollar sign is smallest, hence the brightness of the dollar sign is the highest. The depth corresponding to the poker cards is the next smallest, and therefore the brightness of the poker cards is darker than the brightness of the dollar sign. The depth corresponding to the bulletin board is the largest so the brightness thereof is the lowest.

As shown in FIG. 5, in the present embodiment of the invention, assuming the depth of the dollar sign observed by human eyes is a distance between the human eyes and the display panel 202, then the bulletin board and the poker cards observed by the human eyes may extend toward the human eyes as if caving into the display panel 202.

In light of the foregoing, the present embodiment uses the dollar sign, having the largest depth, as a basis point. That is, the depth value $i_5$ corresponding to the dollar sign is used as a standard value. Next, according to the relationship between the depth values $i_6$ and $i_7$ and the standard value $i_5$, the present embodiment shifts the bulletin board and the poker cards in the 2D original image 500 so as to form a 2D shifting image 500S depicted in FIG. 5B. It should be noted that in subsequent steps, the present embodiment can use the 2D original image 500 and the 2D shifting image 500S to form an image having the 3D effect.

In the present embodiment of the invention, a shifting degree of the aforementioned shifting process is determined by the relationship between the depth values $i_6$ and $i_7$ and the standard value $i_5$. More specifically, the shifting degree of the bulletin board in the 2D shifting image 500S relative to the bulletin board in the 2D original image 500 is determined by a difference value $\Delta i_6$ between the depth value $i_6$ and the standard value $i_5$. The shifting degree of the poker cards in the 2D shifting image 500S relative to the poker cards in the 2D original image 500 is determined by a difference value $\Delta i_7$ between the depth value $i_7$ and the standard value $i_5$ (Step S105).

Figure 5B:
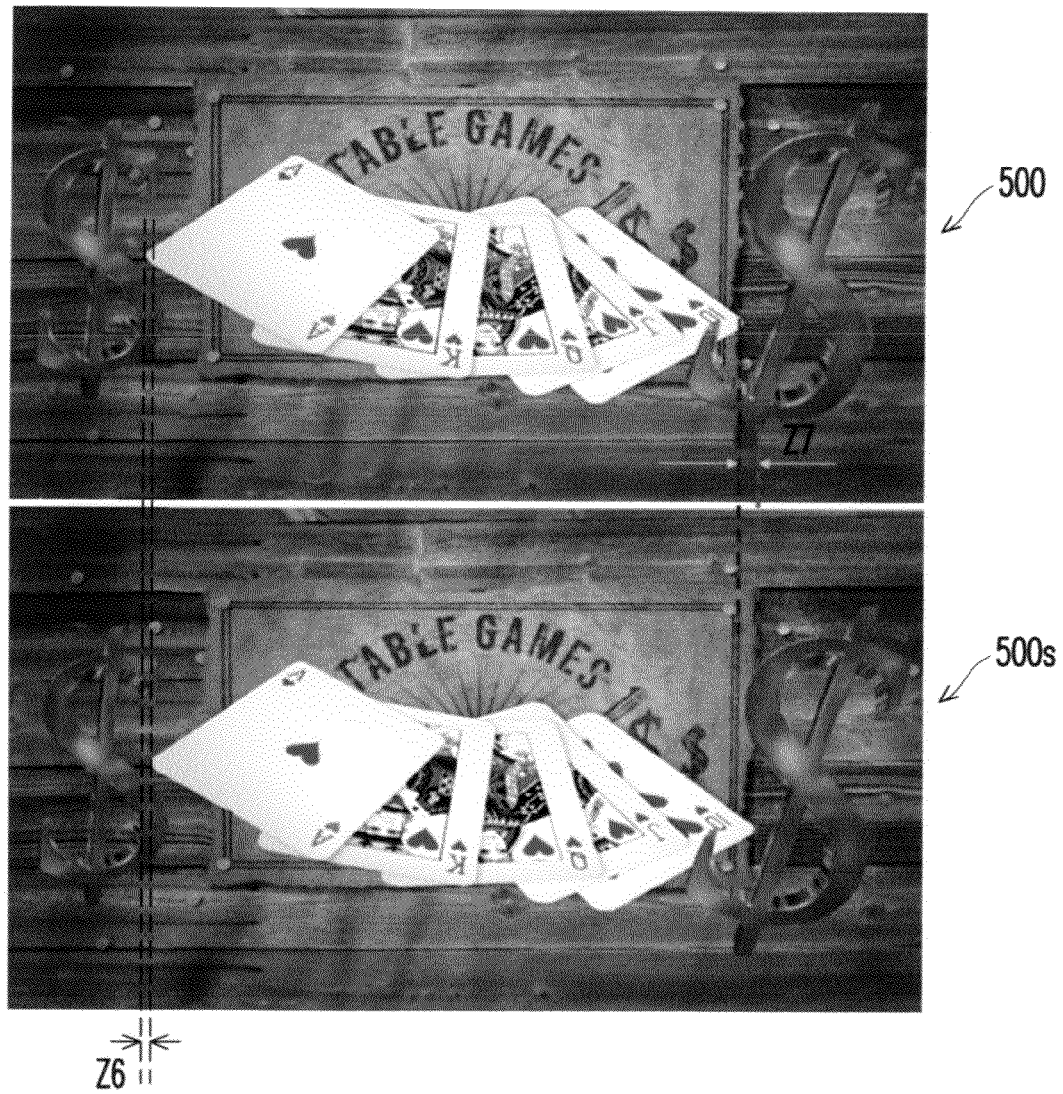
FIG. 5B illustrates a 2D original image and a schematic diagram of a 2D shifting image thereof in accordance with the second embodiment of the invention.

In the present embodiment of the invention, when the difference value between the depth values and the standard value increases, then the shifting degree increases. Conversely, when the difference value decreases, the shifting degree decreases. Since the difference value $\Delta i_7$>the difference value $\Delta i_6$ in the present embodiment, therefore, as shown in FIG. 5B, a shifting value $Z_7$ of the bulletin board in the 2D shifting image 500S is larger than a shifting value $Z_6$ of the poker cards in the 2D shifting image 500S.

In light of the foregoing description, a size of the shifting values $Z_6, Z_7, \ldots$ is respectively determined by the difference values $\Delta i_6, \Delta i_7, \ldots$ However, in other embodiments of the invention, the size of each of the shifting values in the 2D shifting image 500S may be further determined by a gain degree of the difference values between the depth values and the standard value. That is, the size of the shifting value $Z_6$ is determined by the gain degree of the difference value $\Delta i_6$ between the depth value $i_6$ and the standard value $i_5$. Moreover, the size of the shifting value $Z_7$ is determined by the gain degree of the difference value $\Delta i_7$ between the depth value $i_7$ and the standard value $i_5$, and likewise for other shifting values.

Accordingly, assuming the depth values, the standard value, the shifting values, and a gain value used to adjust the gain degree of the shifting values are i, a, Z and G, respectively, then a relationship between each of the depth values i, the standard value a, each of the shifting values Z, and the gain value G can be expressed as $$Z = G \times \left(1 - \frac{i-a}{GL_{max}}\right).$$

Herein, $GL_{max}$ is the largest gray level value of the 2D original image 500. It should be noted that, the size of the shifting values Z can also be solely determined by the difference value between the depth values i and the standard value a. In this case, the gain value G is taken be equal to 1.

Thereafter, in Step S107, a 3D image is produced in accordance with the above-described 2D original image 500 and the 2D shifting image 500S. The aforementioned 3D image producing method is similar to the 3D image producing method described for the first embodiment (i.e., please refer to FIG. 3 in the first embodiment and the related description thereof), therefore no further description is provided hereafter. It should be mentioned that in the present embodiment of the invention, the dollar sign in the 3D image (e.g., an object O4 depicted in FIG. 5) appears to be disposed on the display panel 202 (as shown in FIG. 5), whereas the poker cards (e.g., an object O5 depicted in FIG. 5) and the bulletin board (e.g., an object O6 depicted in FIG. 5) appear to cave in the display panel 202.

Figure 6:
FIG. 6 is a schematic diagram illustrating another 2D original image in accordance with the second embodiment of the invention.

In one embodiment of the invention, the image processing method of the present embodiment may be employed while the main feature of the 3D image is the object having a larger depth. For example, in an image depicted by FIG. 6, a human figure with the largest depth is the main feature this 3D image wishes to express. Therefore, the human figure having the largest depth is used as the basis point, whereby the visual effect of the human figure being depressed into the display panel becomes preferable.

Figure 7:
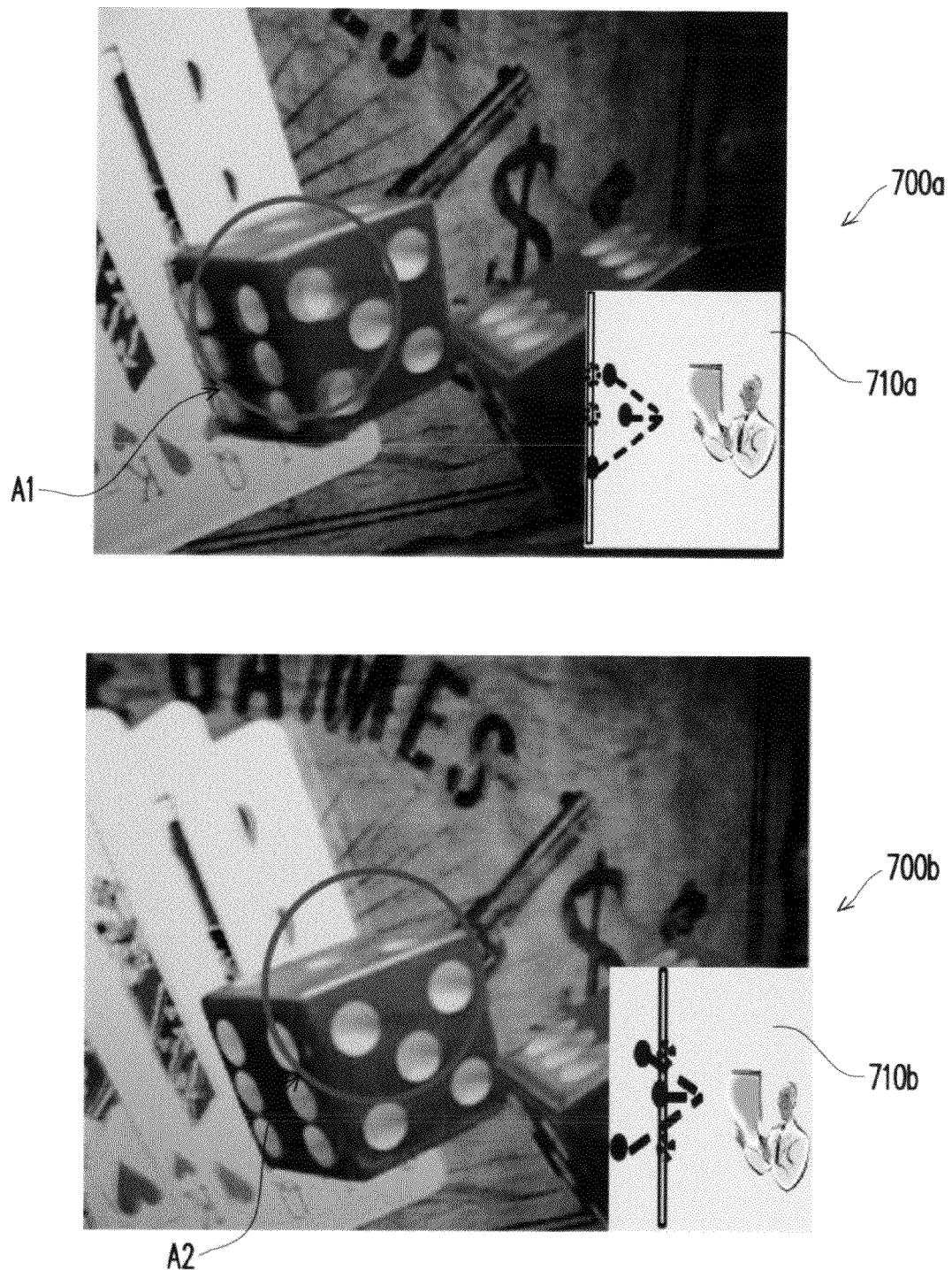
FIG. 7 is a schematic diagram illustrating a comparison between a 3D image produced by a conventional technique and a 3D image produced by the second embodiment of the invention.

It should be noted that, as provided in the second embodiment of the invention, the aforesaid 3D image display method capable of achieving the 3D effect of apparent display inside the display panel may compensate for a cross talk phenomenon produced by non-ideal manufacturing. The aforementioned cross talk phenomenon is directed to a visually blurred phenomenon occurring while viewing 3D images, when the left eye views the image rendered for the right eye by the display panel, and the right eye views the image rendered for the left eye. An illustration is provided in FIG. 7, which depicts a schematic diagram comparing a 3D image produced by a conventional technique and a 3D image produced by the second embodiment of the invention. In a conventional 3D image 700a, a region A1 appears to be highly blurred due to the cross talk phenomenon. By contrast, in a 3D image 700b produced by the second embodiment of the invention, a region A2 appears quite clear when compared to the region A1 of the conventional 3D image 700a. By the way, objects in the conventional 3D image 700a are set to be outside of the display panel such as sub-picture 710a illustrated. Moreover, objects in the 3D image 700b are set to be inside of the display panel such as sub-picture 710b illustrated.

In light of the foregoing, the image processing method provided by the invention embodied herein can produce a 3D image with a readily available 2D image. The 3D effect of the 3D image is achieved by using the depth of each of the image sub-regions as the basis. Moreover, the image processing method provided by the invention embodied herein is adaptable in any 3D display devices, and the 3D effect may be adjusted according to the needs of the viewer.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing method, comprising:
   receiving, by an image processor, a two-dimensional (2D) original image by a processor;
   receiving, by the image processor, a plurality of depth values corresponding to the 2D original image;
   obtaining, by the image processor, a 2D shifting image according to the depth values and a standard value, wherein a plurality of shifting values exist between the 2D shifting image and the 2D original image, and the shifting values are determined by a plurality of difference values between the depth values and the standard value; and
   producing, by the image processor, a three-dimensional (3D) image according to the 2D original image and the 2D shifting image,
   wherein when a largest gray level value of the 2D original image is $GL_{max}$, each of the depth values is i, the standard value is a, each of the shifting values is Z and the gain value used to adjust a gain degree of each of the shifting values is G, then Z, i, a, G, and $GL_{max}$ are related to each other by $$Z = G \times \left(1 - \frac{i-a}{GL_{max}}\right).$$

2. The image processing method as claimed in claim 1, wherein the depth values are less than or equal to the standard value.

3. The image processing method as claimed in claim 1, wherein the depth values are greater than or equal to the standard value.

4. The image processing method as claimed in claim 1, wherein the standard value is between a largest value and a smallest value of the depth values.

5. The image processing method as claimed in claim 1, wherein the 2D original image comprises a plurality of image sub-regions, and the depth values respectively correspond to the image sub-regions for respectively representing a depth of each of the image sub-regions.

6. The image processing method as claimed in claim 1, wherein the 2D original image comprises a plurality of first image sub-regions, and the 2D shifting image comprises a plurality of second image sub-regions, the second image sub-regions shifting right relative to the first image sub-regions.

7. The image processing method as claimed in claim 1, wherein the 2D original image comprises a plurality of first image sub-regions, and the 2D shifting image comprises a plurality of second image sub-regions, the second image sub-regions shifting left relative to the first image sub-regions.

8. The image processing method as claimed in claim 1, wherein the step of obtaining the 2D shifting image according to the depth values and the standard value, wherein a plurality of shifting values exist between the 2D shifting image and the 2D original image, and the shifting values are determined by a plurality of difference values between the depth values and the standard value comprises:
   determining the shifting values in accordance with multiplying a gain value with the difference values between the depth values and the standard value.

9. The image processing method as claimed in claim 1, wherein the step of producing the 3D image according to the 2D original image and the 2D shifting image comprises:
   obtaining a first eye image according to the 2D original image;
   obtaining a second eye image according to the 2D shifting image; and
   producing the 3D image by combining the first eye image and the second eye image.

10. The image processing method as claimed in claim 9, wherein the step of obtaining the first eye image according to the 2D original image comprises:
   obtaining the first eye image according to a plurality of odd-numbered columns of image sub-regions of the 2D original image.

11. The image processing method as claimed in claim 9, wherein the step of obtaining a second eye image according to the 2D shifting image comprises:
   obtaining the second eye image according to a plurality of even-numbered columns of image sub-regions of the 2D shifting image.

12. The image processing method as claimed in claim 9, wherein the step of producing the 3D image by combining the first eye image and the second eye image comprises:
   producing the 3D image by combining the odd-numbered columns of image sub-regions with the even-numbered columns of image sub-regions, wherein the odd-numbered columns of image sub-regions are arranged alternating with the even-numbered columns of image sub-regions.

13. An image processing method, comprising:
   receiving, by an image processor, a two-dimensional (2D) original image by a processor;
   receiving, by the image processor, a plurality of depth values corresponding to the 2D original image;
   obtaining, by the image processor, a 2D shifting image according to the depth values and a standard value, wherein a plurality of shifting values exist between the 2D shifting image and the 2D original image, and the shifting values are determined by a plurality of difference values between the depth values and the standard value; and
   producing, by the image processor, a three-dimensional (3D) image according to the 2D original image and the 2D shifting image,
   wherein when the largest gray level value of the 2D original image is $GL_{max}$, each of the depth values is i, the standard value is a, each of the shifting values is Z, and the gain value used to adjust the gain degree of each of the shifting values is G, then Z, i, a, G, and $GL_{max}$ are related to each other by $$Z = G \times \left(\frac{i-a}{GL_{max}}\right).$$

14. The image processing method as claimed in claim 13, wherein the depth values are less than or equal to the standard value.

15. The image processing method as claimed in claim 13, wherein the depth values are greater than or equal to the standard value.

16. The image processing method as claimed in claim 13, wherein the standard value is between a largest value and a smallest value of the depth values.

17. The image processing method as claimed in claim 13, wherein the 2D original image comprises a plurality of image sub-regions, and the depth values respectively correspond to the image sub-regions for respectively representing a depth of each of the image sub-regions.

18. The image processing method as claimed in claim 13, wherein the 2D original image comprises a plurality of first image sub-regions, and the 2D shifting image comprises a plurality of second image sub-regions, the second image sub-regions shifting right relative to the first image sub-regions.

19. The image processing method as claimed in claim 13, wherein the 2D original image comprises a plurality of first image sub-regions, and the 2D shifting image comprises a plurality of second image sub-regions, the second image sub-regions shifting left relative to the first image sub-regions.

20. The image processing method as claimed in claim 13, wherein the step of obtaining the 2D shifting image according to the depth values and the standard value, wherein a plurality of shifting values exist between the 2D shifting image and the 2D original image, and the shifting values are determined by a plurality of difference values between the depth values and the standard value comprises:
    determining the shifting values in accordance with multiplying a gain value with the difference values between the depth values and the standard value.

\* \* \* \* \*